(12) United States Patent
Geisbrecht et al.

(10) Patent No.: US 6,994,930 B1
(45) Date of Patent: Feb. 7, 2006

(54) DIRECT FIRED RECIPROCATING ENGINE AND BOTTOMING HIGH TEMPERATURE FUEL CELL HYBRID

(75) Inventors: Rodney A. Geisbrecht, New Alexandria, PA (US); Norman T. Holcombe, McMurray, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 689 days.

(21) Appl. No.: 10/225,722

(22) Filed: Aug. 21, 2002

(51) Int. Cl.
*H01M 8/06* (2006.01)
*H01M 8/04* (2006.01)
*F02B 43/00* (2006.01)

(52) U.S. Cl. .......................... 429/19; 429/22; 429/26; 123/2; 123/3; 60/282

(58) Field of Classification Search ................ None
See application file for complete search history.

(56) References Cited

U.S. PATENT DOCUMENTS

| 6,502,533 B1 * | 1/2003 | Meacham ...................... 123/3 |
| 6,655,325 B1 * | 12/2003 | Botti et al. .................... 123/3 |

FOREIGN PATENT DOCUMENTS

JP  2002-151119  * 5/2002

* cited by examiner

*Primary Examiner*—Jonathan Crepeau
(74) *Attorney, Agent, or Firm*—Bradley W. Smith; Mark P. Dvorscak; Paul A. Gottlieb

(57) ABSTRACT

A system of a fuel cell bottoming an internal combustion engine. The engine exhaust gas may be combined in varying degrees with air and fed as input to a fuel cell. Reformer and oxidizers may be combined with heat exchangers to accommodate rich and lean burn conditions in the engine in peaking and base load conditions without producing high concentrations of harmful emissions.

20 Claims, 14 Drawing Sheets

DIRECT FIRED RECIPROCATING ENGINE AND BOTTOMING HIGH TEMPERATURE FUEL CELL HYBRID

CONTRACTUAL ORIGIN OF THE INVENTION

The United States Government has rights in this invention pursuant the employer-employee relationship of the Government to the inventors as U.S. Department of Energy employees at the National Energy Technology Laboratory.

BACKGROUND OF THE INVENTION

This invention relates to hybrid engine systems including a combination of heat engine such as an internal combustion engine and a fuel cell where the fuel cell bottoms the heat engine. Although hybrid engine systems have been discussed in the past, the prior art has always combined an internal combustion or turbine as a bottom to a fuel cell. The present invention reverses the order and obtains many benefits by using a fuel cell as a bottom to a heat engine such as a direct fired reciprocating engine.

SUMMARY OF THE INVENTION

This invention offers a simple means of significantly improving the fuel efficiency, power density, and environmental performance of reciprocating engines in the 1–1000 kW range while simultaneously improving the startup, load following, and portability characteristics of an associated high temperature fuel cell, by hybridizing the production of power from both units. Furthermore, this invention offers an effective means to overcome common barriers to the use of advanced engines such as those using compact 2-cycle variations, Atkinson/Miller cycles, or homogeneously charged compression ignition (HCCI); specifically, NOX and unburned hydrocarbons are mitigated by a flexible operating envelope that permits both rich and lean engine operating modes, depending upon system power loads. Finally, this invention capitalizes on, and hence facilitates usage of, advanced future fuels that possess superior attributes (such as reformability) in advanced engines or their hybrids with fuel cells.

In the present invention, high temperature fuel cell modules process fuel that has been sufficiently reformed directly or indirectly in an engine which is fired with distillate fuel or natural gas in a similar manner to an engines-only application; SECA and solid oxide fuel cells (SOFC) modules are being developed for the 1–10 kW range, and therefore match up nicely with a small engine application below the 1000 kW range. The invention includes heat engines combined with MCFC modules which are also nearing commercialization. Rich-burn and lean-burn configurations are possible. In the rich-burn configuration, the engine is operated at air to fuel equivalence ratios less than 1. All engine exhaust is passed as fuel to the fuel cell. An optional intervening fuel reformer of the autothermal type and optional NOX reducer are used if necessary to complete the transformation of fuel into a suitable fuel for the high temperature fuel cell and to complete reduction of NOX beyond that achievable in the fuel cell alone. In the lean-burn configuration, wherein the fuel to air equivalence ratio is less than 1 variable portion of the engine exhaust is split between fuel feeds and air feeds to the high temperature fuel cell. The exhaust split is determined by the relative loads of the engine and fuel, which in turns depends upon the fuel split between the engine and fuel cell. As in the rich-burn configuration, NOX reduction is accommodated in intervening units including an autothermal reformer to the extent that mitigation is not sufficient within the fuel cell alone.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

The present invention together with the above and other objects and advantages may best be understood from the following detailed description of the embodiment of the invention illustrated in the drawings.

BRIEF DESCRIPTION OF DRAWINGS

Figure 1:
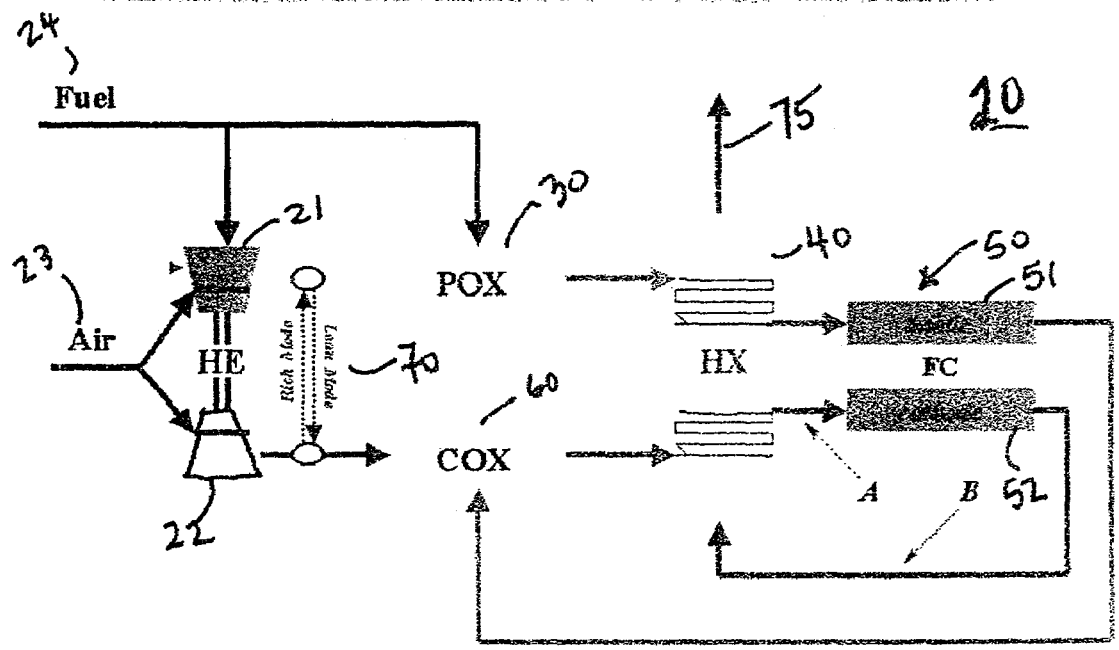
Figure 2:
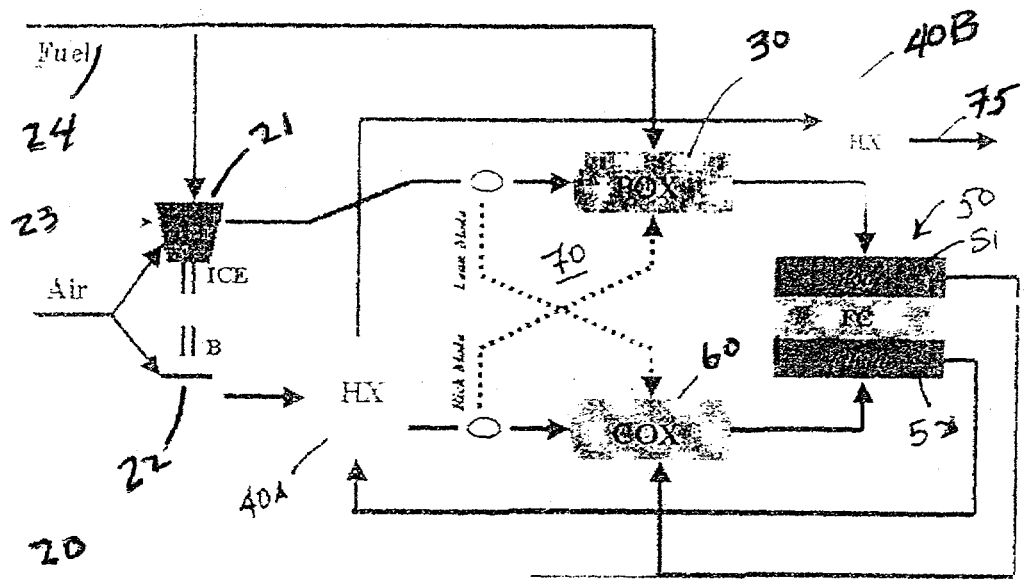
Figure 3:
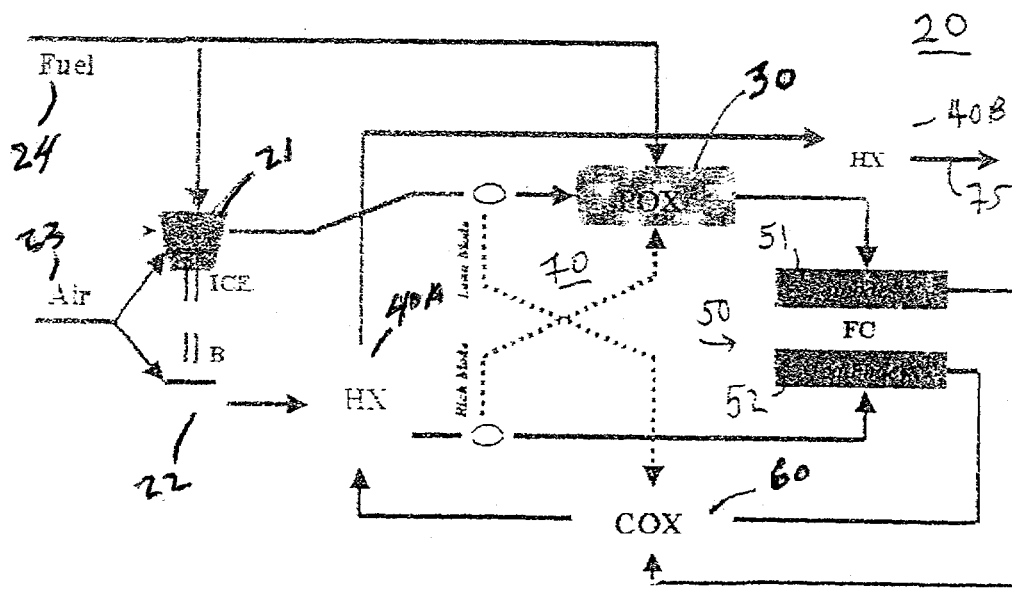

FIG. 1 is a schematic of the major components of the hybrid heat engine-fuel cell of the present invention including major components of the invention with optional locations for spent fuel combustion and NOX reduction;

FIG. 2 is a schematic illustration of an embodiment of the direct fired reforming heat engine-bottoming fuel cell hybrid of the present invention;

FIG. 3 is another embodiment of the direct fired reforming heat engine-bottoming fuel cell hybrid of the present invention; and FIGS. 4–15 are schematic representations of various operating scenarios for the direct fired reforming heat engine-bottoming fuel cell hybrids of the present invention.

DETAILED DESCRIPTION OF THE PRESENT INVENTION

Referring now to FIG. 1, there is shown a schematic of the major components of the present invention; however, the actual locations of the spent fuel combustion and the NOX reduction are optional and variable. Spent fuel combustion is shown in the figure as occurring in oxidizing reactor, either catalytic or non-catalytic, (COX) upstream of the high temperature heat exchanger HX, but the COX may be located downstream of the HX, before or after the cathode (locations A and B, respectively). The NOX reduction options include the reformer, either catalytic or autothermal (POX), COX reactor, and the anode itself.

More specifically, the hybrid system 20 illustrated in FIG. 1 may include an internal combustion engine 21 and a blower 22, both connected to a source of air 23. The heat engine or internal combustion engine 21 used as an example herein without limiting the definition of heat engine is also connected to a source of fuel 24. A reformer 30 which may or may not be a catalytic reformer, is also in communication with the source of fuel 24 and in selective communication with the exhaust gas from the heat engine or internal combustion engine 21. The reformer 30 produces an exhaust which passes through a high temperature heat exchanger 40 and enters a fuel cell 50 as a feed or input to an anode 51. The fuel cell 50 includes the usual anode 51 and cathode 52, the output from the anode 51 being directed to an oxidizer 60 which may or may not be a catalytic oxidizer. The oxidizer 60 receives a variable input from the blower 22, as well as a variable portion of the exhaust from the heat engine or internal combustion engine 21, as will be explained. The output from the oxidizer 60 travels through the high temperature heat exchanger 40 and enters the cathode 52 of the fuel cell 50 as a feed or an input. As illustrated in FIG. 1, the oxidizer 60 may be located intermediate the heat exchanger 40 and the fuel cell 50 as illustrated in the position A or located intermediate the cathode output 52 and the heat exchanger 40 as indicated by the reference letter B.

A proportioning mechanism 70 is in communication with the output of the heat engine or internal combustion engine 21 and the blower 22 so as to vary the composition of the input to either the reformer 30 or the oxidizer 60, as required according to whether the engine is operating in a rich mode condition wherein the fuel to air equivalence ratio is greater than 1 or a lean mode condition in which the air to fuel equivalence ratio is greater than 1. As will be explained more fully hereafter, the oxidizer may be a catalytic oxidizer or a thermal oxidizer and the reformer may be a catalytic reformer or a pre-reformer or simply a mixer, depending upon the fuel and application of the system, as hereinafter described. Finally, an exhaust stream 75 is vented to the atmosphere after passing through the heat exchanger 40.

As understood by those skilled in the art, a fuel cell 50 requires synthesis gas, preferably hydrogen and carbon monoxide, although light hydrocarbons having about 90% of the carbon chain being less than or equal to 3 may be used. Depending on the fuel used, a reformer 30 may be required to react the engine 21 output with unconverted fuel to produce the required feed to the fuel cell anode 51. In the event, as discussed hereinafter, that the output from the engine 21 is sufficiently clean from an engine running on a fuel such as clean natural gas under rich conditions, the reformer 30 may not be required. When required, the reformer 30 partially reforms fuel to produce a combination of hydrogen, carbon monoxide and light hydrocarbons. Where hydrocarbons are present, soot production is avoided either by the presence of steam or by reacting in the reformer 30 to convert excess fuel to carbon monoxide and hydrogen. The input to the anode 51 is the output from the reformer 30, if required, after passing through the high temperature heat exchanger 40. As indicated, the anode output 51 is directed to the oxidizer 60 which depending on the composition of the anode output, may be a catalytic oxidizer or otherwise. When the engine 21 is operated under rich conditions, the exhaust therefrom includes fuel components, steam and hot synthesis gas. Under these conditions, little if any NOX is produced and what is produced may be reduced by the presence of the carbon monoxide and hydrogen forming the synthesis gas. When the engine 21 is operated under the poorest of rich conditions and lean conditions, then reformer 30 is required in order to sufficiently reform fuel and reduce NOX levels when required in the engine exhaust fed to the reformer.

One of the major advantages of the present invention is the ability to accommodate, through the proportioning mechanism 70, both lean and rich conditions of the engine 21. In addition, the invention also accommodates fuels of widely different compositions, being able to accommodate fuels such as gasoline, diesel, natural gas and others. The exhaust 75 from the system may be substantially free of NOX, on the order of 0.1 g/horsepower-hour, under some conditions hereinafter described. Under other conditions, NOX measurements up to 1 g./horsepower-hour are obtained.

Another advantage of the system 20 of the present invention is because fuel cells 50 need to be heated to operate, fuel cells are not particularly efficient under startup conditions, therefore use of a fuel cell 50 as a bottoming to a direct fired reforming heat engine 21 is a significant improvement.

Moreover, when an internal combustion engine 21 operates at very rich conditions, little NOX is produced, but the engine loses a significant amount of hydrocarbons which are, in the present invention, used by the fuel cell 50 and not discharged to the atmosphere or require costly remediation. When the engine 21 operates at slightly rich to very lean conditions, considerable NOX are produced, but the fuel cell 50 plus the oxidizer 60 mitigate the NOX exiting the system 20 of the present invention.

Referring now to FIGS. 2 and 3, there are illustrated other specific examples of the hybrid system 20 previously described. In FIGS. 2 and 3, the major components illustrated in FIG. 1 are the same with only the position of the components being altered and the heat exchanger 40 are being represented by two separate heat exchangers, it being understood that the heat exchangers 40 are illustrated by way of representation only and may be located in a variety of places within the system, as needed. It will be understood by those skilled in the art that the major components of system 20 can be varied in their location and design according to engine operation and fuel characteristics.

Figure 4:
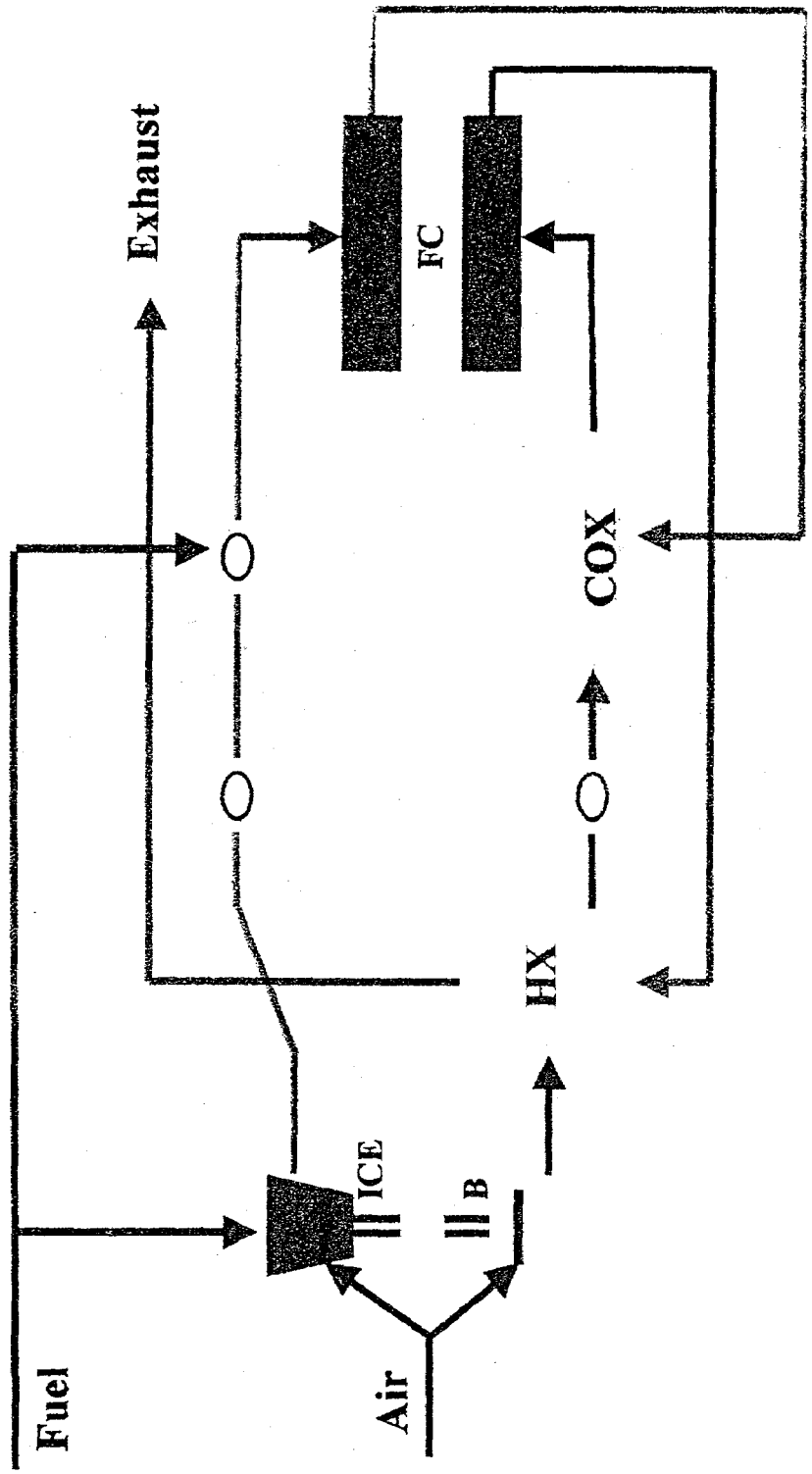
Figure 5:
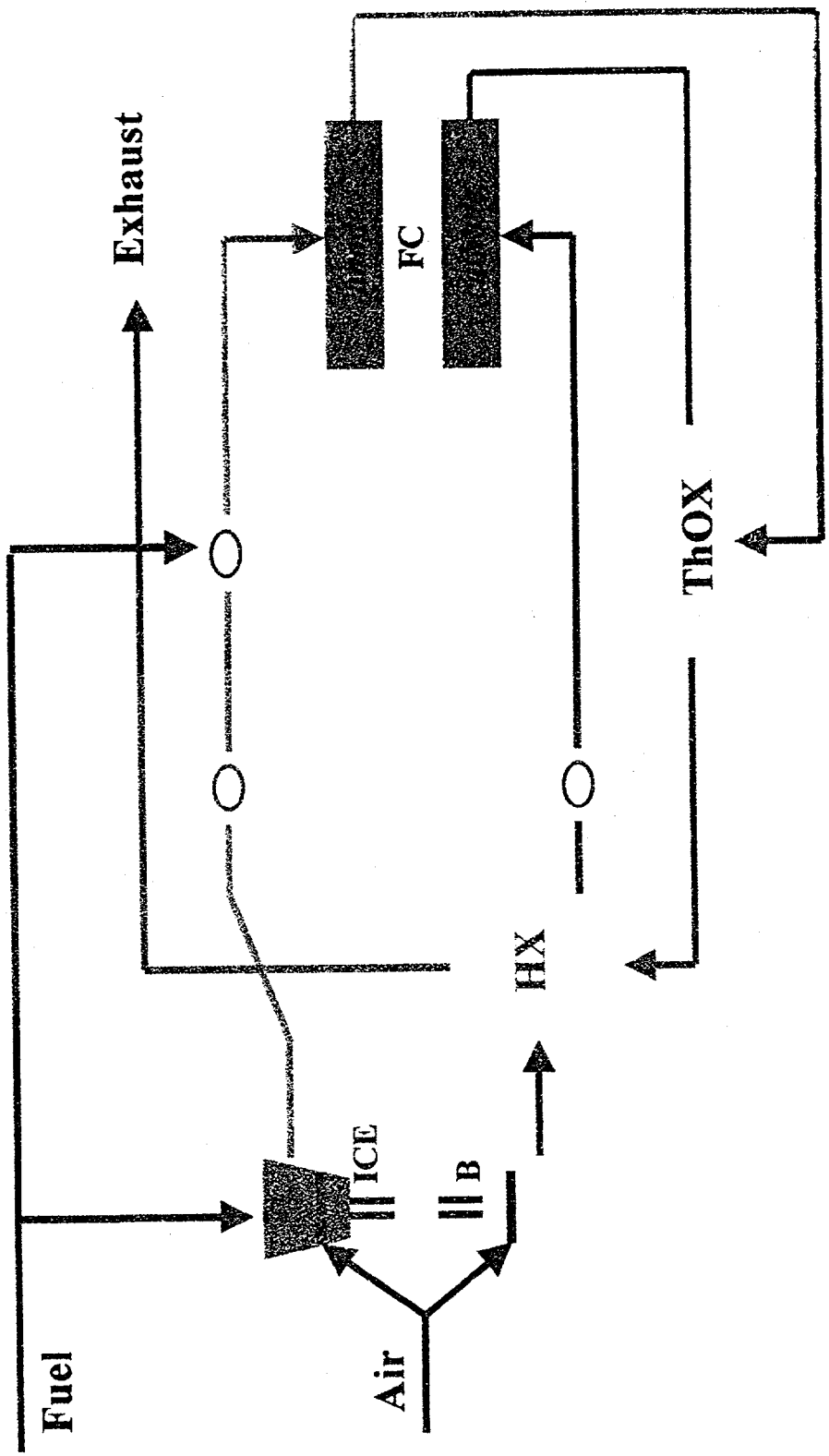
Figure 6:
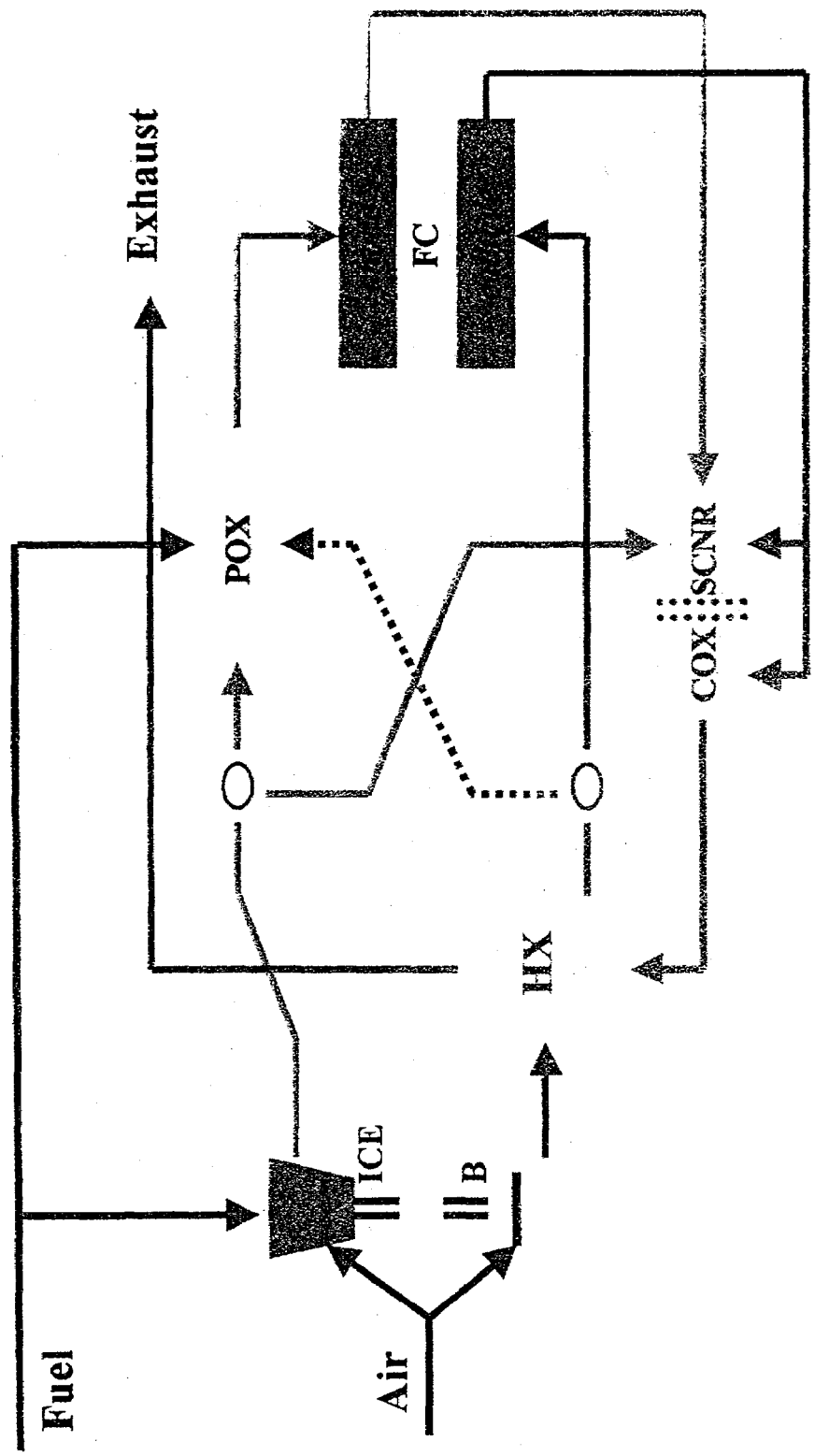
Figure 7:
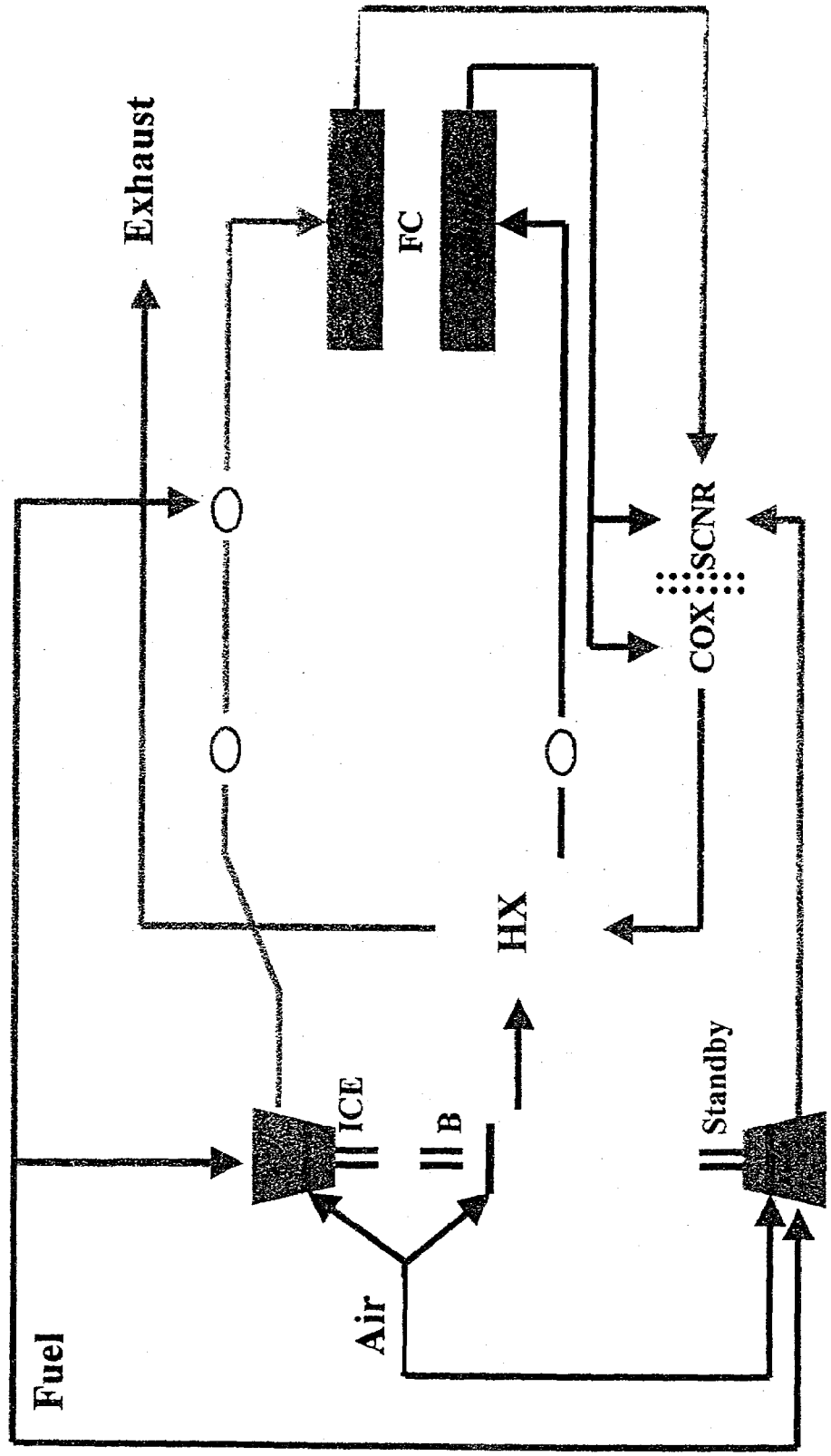
Figure 8:
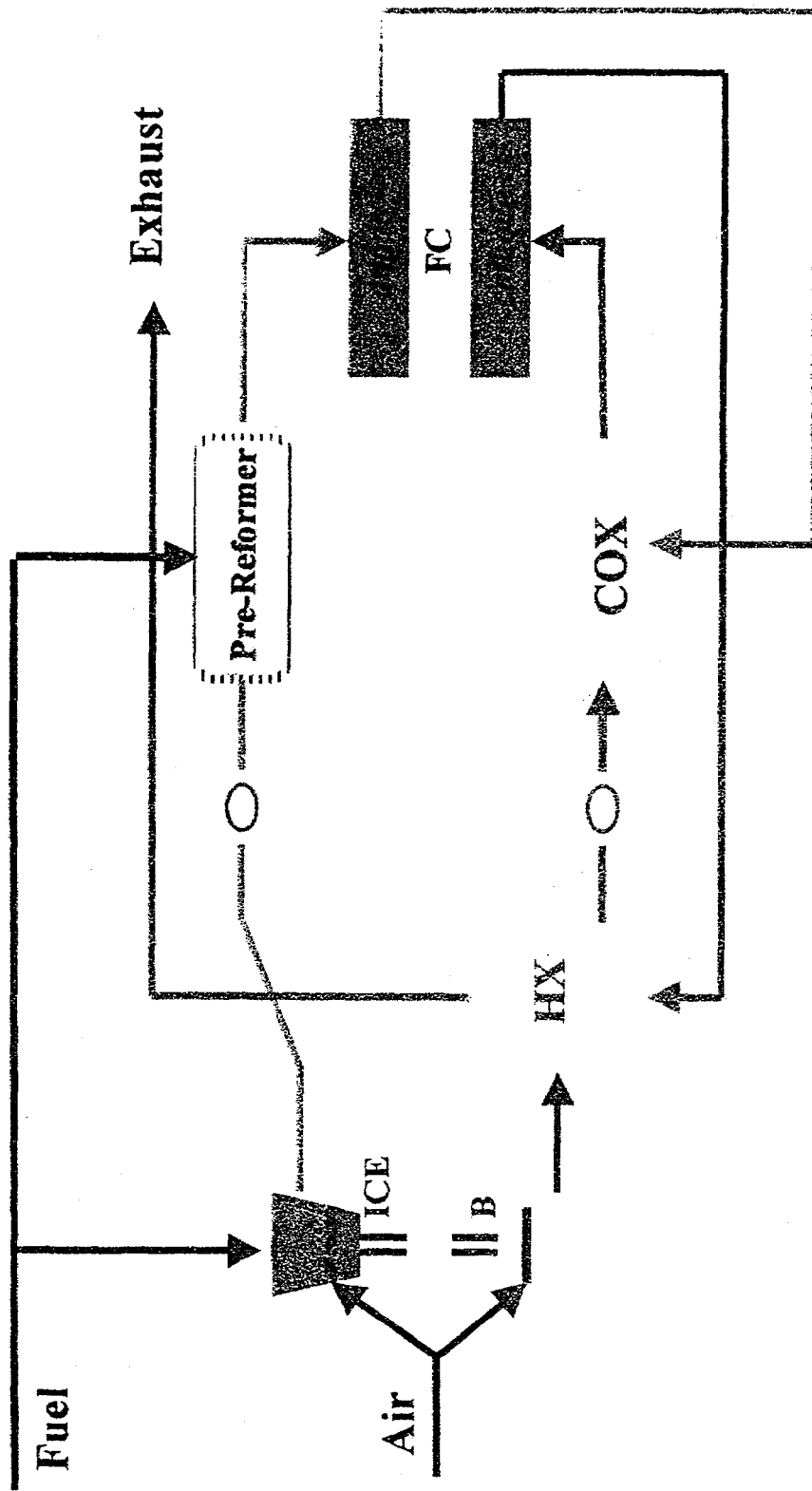
Figure 9:
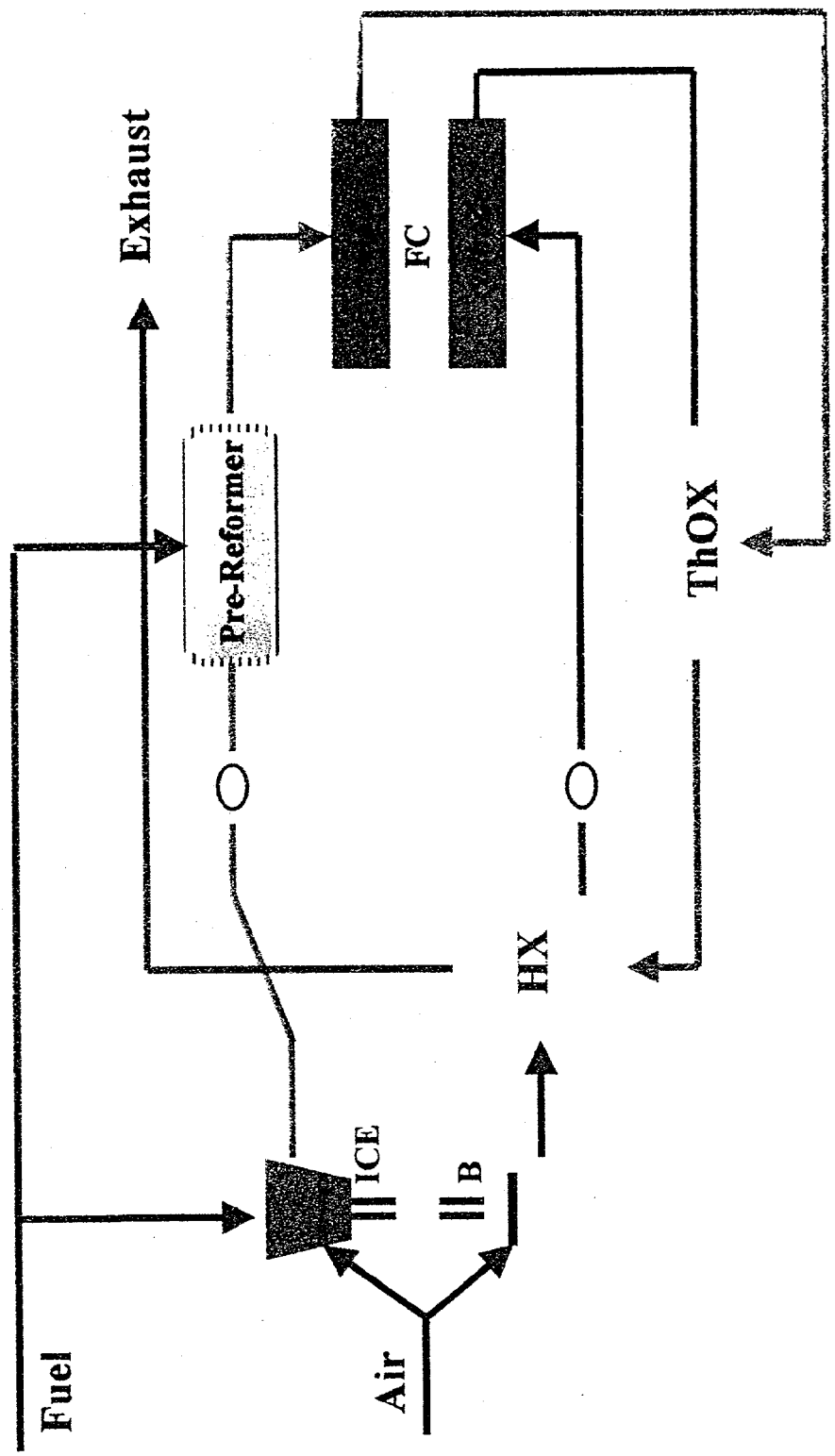
Figure 10:
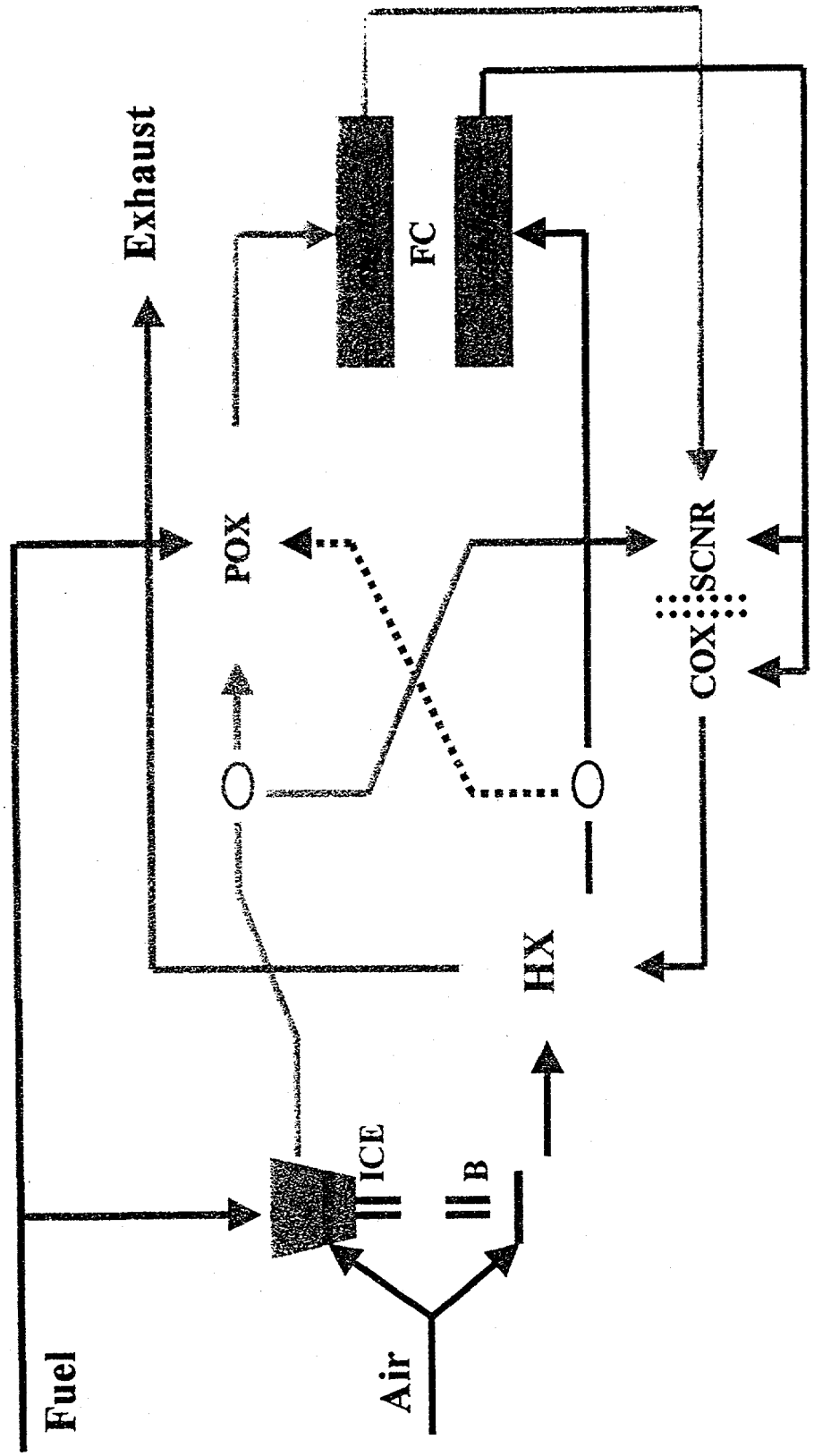
Figure 11:
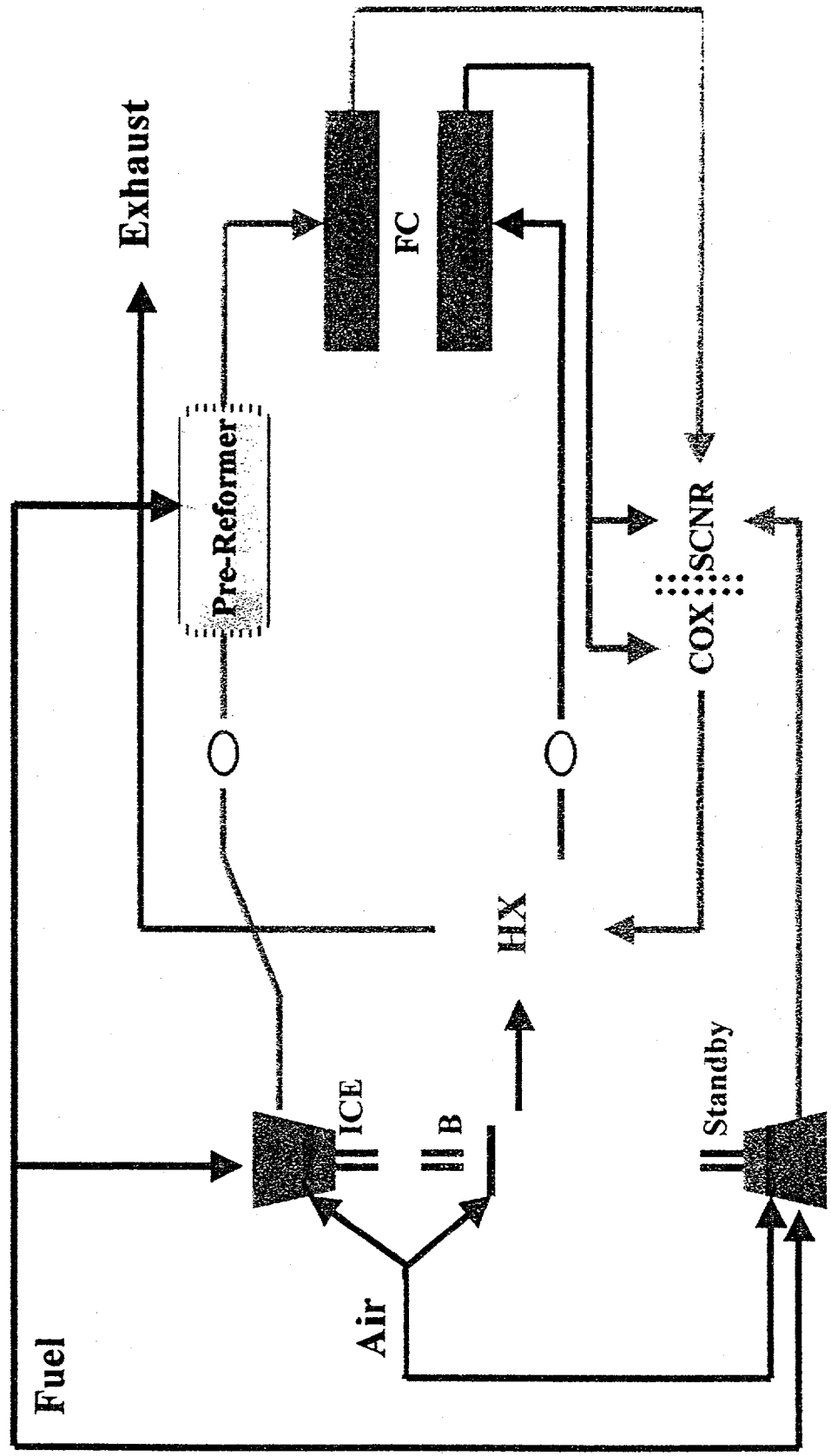
Figure 12:
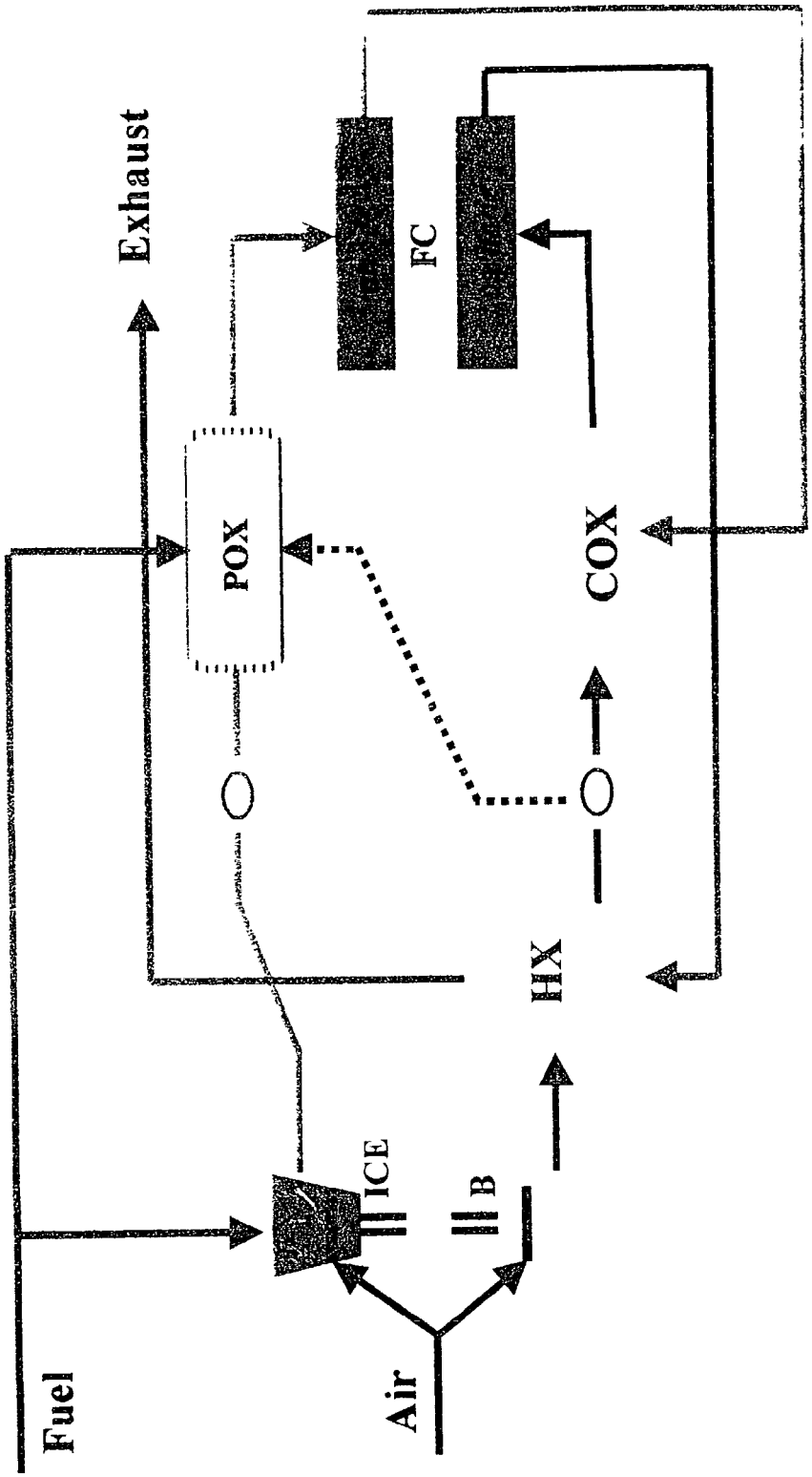
Figure 13:
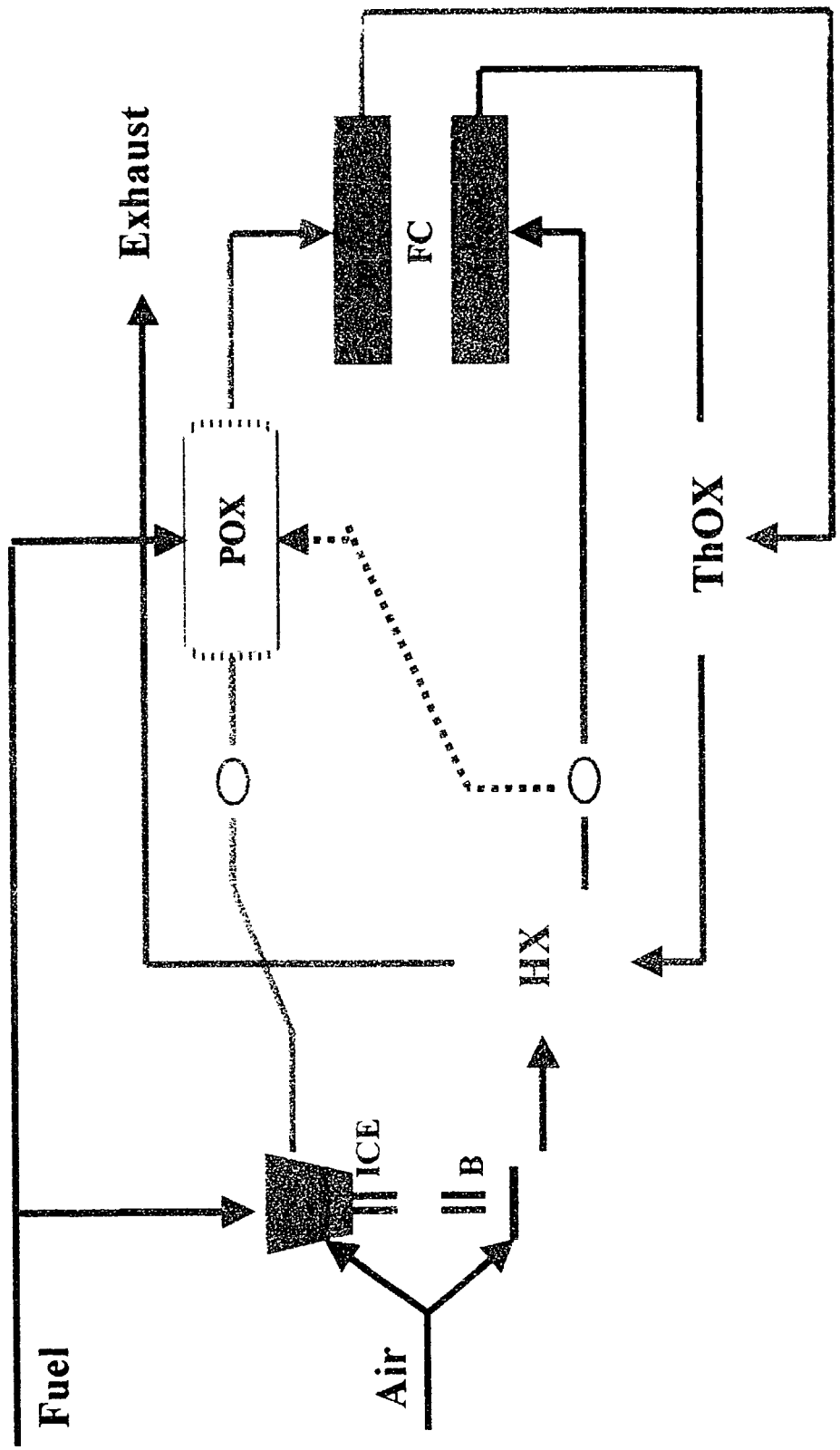
Figure 14:
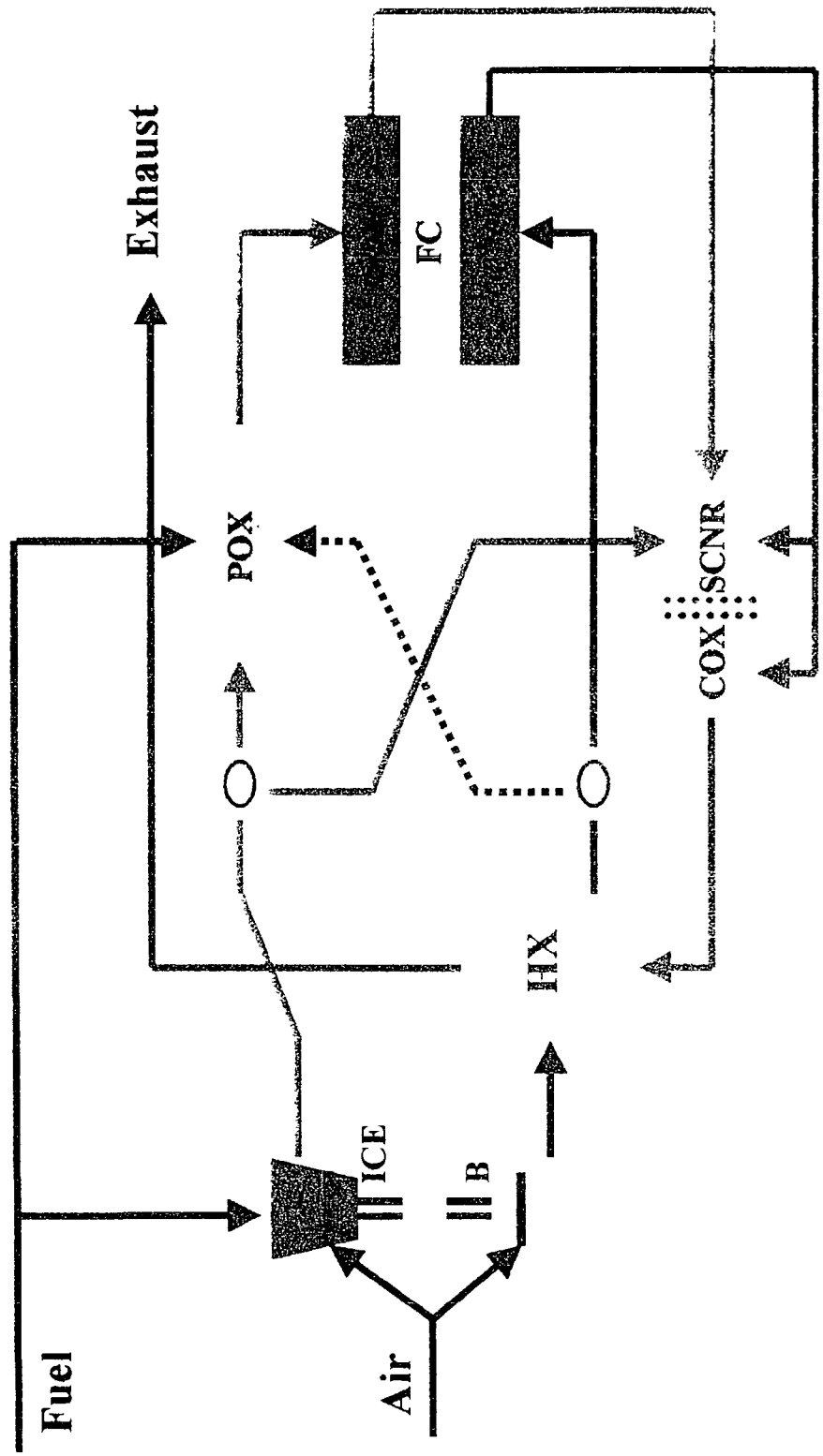
Figure 15:
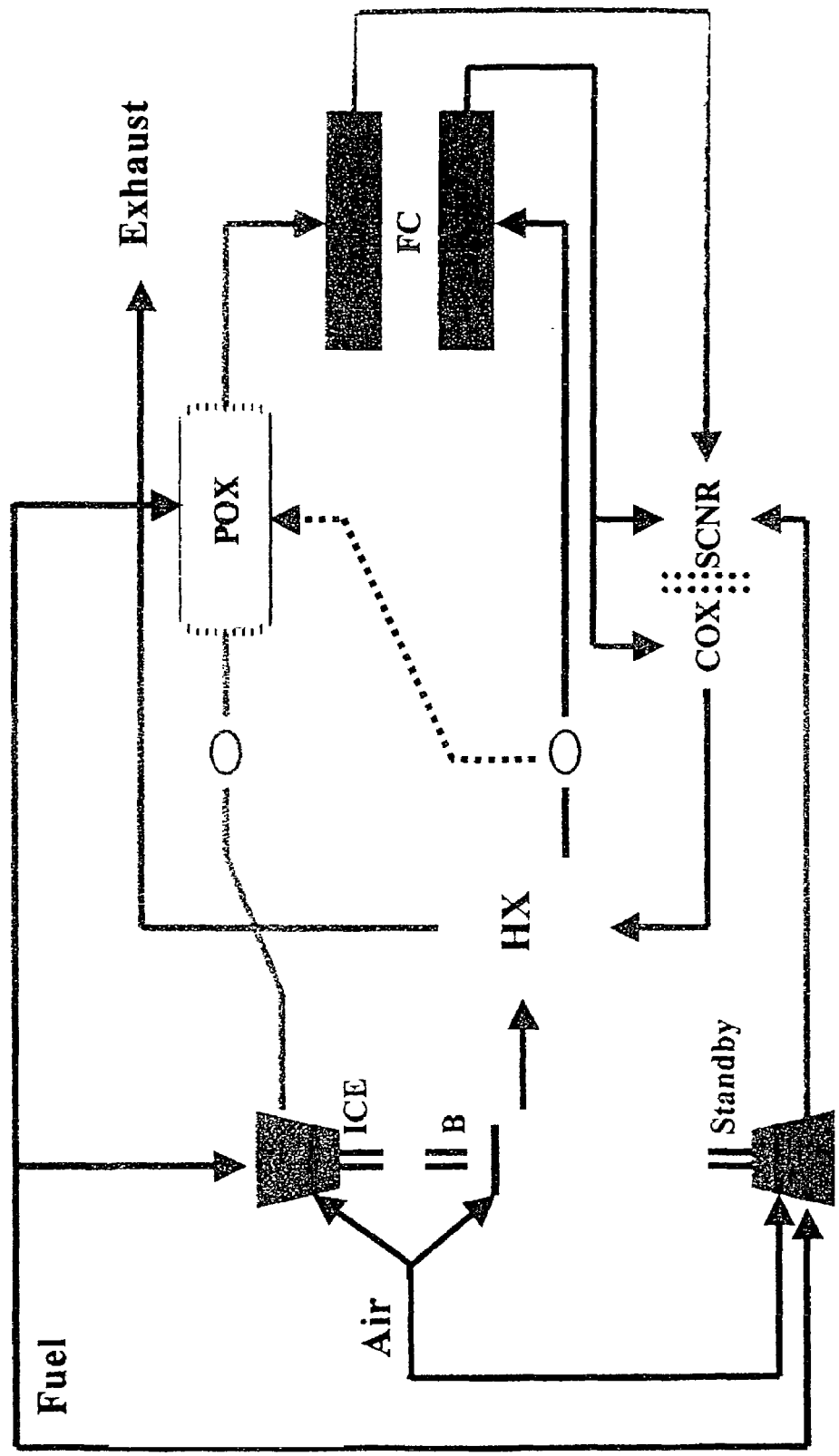

Referring now to FIGS. 4 to 15, there are disclosed a series of operating conditions in which different conditions require different combinations of the principle components of the present invention 20. FIG. 4 shows a base load power application (rich engine) with an upstream catalytic oxidizer using clean natural gas. FIG. 5 shows a base power application (rich engine) with a downstream thermal oxidizer using clean natural gas. FIG. 6 shows a peaking power application (lean engine) peaking with a single engine using clean natural gas with both a catalytic oxidizer and a selective catalytic NOX reduction reactor. FIG. 7 shows a peaking power application with two engines (one rich and the other lean) using clean natural gas with both a catalytic oxidizer and a selective catalytic NOX reduction reactor. FIGS. 8 to 15 illustrate additional operational scenarios.

FIGS. 4–7 are for a lean natural gas. FIGS. 8–11 are the corresponding scenarios for rich natural gas or light naphtha; FIGS. 12–15 are the corresponding scenarios for heavy naphtha. They differ from each other only with respect to the fuel reformer—a noncatalytic adiabatic mixer, a catalytic pre-reformer, or a catalytic autothermal reformer.

FIGS. 4 and 5; 8 and 9; and 12 and 13 correspond to the FIGS. 2 and 3 (upstream vs. downstream oxidizer locations), when the power application is for baseload only (shown as rich mode in FIGS. 1–3); FIGS. 6 and 7; 10 and 11; and 14 and 15 are for an application that is load following (peaking) by means of one engine or a separate standby engine (shown as lean mode in FIGS. 1–3). These are shown only for the downstream oxidizer location, although another set (not shown) illustrates the upstream case.

There is flexibility in fuel and dispatch schedule. Both influence system design including whether or not certain catalytic reactors are required. To minimize carbon formation in the engine, natural gas and light naphtha's are preferred. These are chemically less prone to carbon formation and can be premixed with air for a homogeneous charge, eliminating issues specific to direct injection systems. Although generally low in sulfur and carbon precursors, some natural gases and light naphtha's may require poisoning or deactivation resistance in any catalysts required.

Dispatch schedules include base load or peaking, with respect to whether or not the system serves a significantly varying load during the on-period of its operating cycle. For peaking applications, excess engine capacity is used for load following by shifting from a rich operating mode to a lean operating mode while maintaining the fuel cell at its optimal operating point. This shift can be accommodated within a single engine or in the aggregate by starting at least one standby lean burn engine while maintaining the base load engine at rich conditions. In the former case, this is accomplished by unthrottling and speeding up the single engine and rebalancing the fuel and engine exhaust splits according to the proportioning mechanism 70 in FIG. 1.

In the latter case, the exhaust split to the cathode side is taken from the standby engines.

The proportioning mechanism 70 is controlled by an algorithm which varies the input composition and flow rate to both the oxidizer and reformer, if required, from the blower and engine exhaust as a function of engine fuel composition (carbon, hydrogen, oxygen and nitrogen) and flow rate, fuel cell anode feed composition and flow rate, fuel cell cathode feed composition and flow rate, fuel cell anode output composition and flow rate, fuel cell cathode output composition and flow rate, fuel cell power output, and system load requirements, both peaking and base as well as the ratio of peaking to base loads. The algorithm may also take into account the presence, type and capacity of the reformer as well as the presence, type and capacity of the oxidizer. The algorithm also controls engine operation from rich to lean to stoichiometric depending on system variables. Providing the algorithm is within the skill of the art, after the system design is described.

Depending upon the choices in fuel and dispatch schedule, catalysts may be needed for fuel reforming, NOX reduction, and oxidation of unburned hydrocarbons and spent fuel.

Reforming Catalysts
- Noble Metals—supported Pt group promoted by oxide ion conductors such as ceria for autothermal reforming of light to heavy naphtha's containing sulfur (see ANL's ceria promoted platinum catalyst supported on alumina).
- Transition Metals—Ni group with various alkali promoters and supports for pre-reforming or reforming of natural gas or light naphtha's with low sulfur (see Synetix suite of NiO based catalysts).

For a base load application with a clean and lean natural gas, a reforming catalyst is not needed at all since sufficient reforming will have been achieved within the engine; with natural gases rich in higher hydrocarbons or with naphtha's, a nickel oxide pre-reforming catalyst is needed to convert higher hydrocarbons to methane and CO. For a peaking application, no change is indicated if standby engines are used; if the base load engine is used, a promoted nickel oxide autothermal reforming catalyst is indicated since supplemental reforming will be needed to offset a reduced reformate make in the engine. If sulfur levels are high, nickel oxide based catalysts will need to be replaced by platinum based catalysts.

NOX Reduction Catalysts
- Noble Metals—Pt group (notably Rh or Pd) promoted by ceria and others for selective catalytic reduction at low temperatures using CO (see 3-way automotive catalysts).
- Base Metals—Titanium, vanadium group for selective reduction at intermediate temperatures using ammonia or other nitrogen based reductants (see Engelhard's vanadia titania catalyst).
- Metal Exchanged Zeolites—ZSM-5 exchanged with various metals, notably silver promoted by ceria for selective reduction using hydrocarbon reagents at high temperatures.

For a base load application with any fuel, a NOX reduction catalyst is not needed at all, a consequence of the rich burn conditions in the engine. For a peaking application, at least one engine (possibly the base load engine) will be in lean mode and producing significant NOX. All or a portion of this NOX will be reduced by using spent fuel as the reducing reagent (spent fuel significantly exceeds the stoichiometric NOX equivalent, allowing for a relaxed requirement on the selectivity of the reaction). The remainder of NOX will be reduced in the fuel reformer and fuel cell anode if they are, or can be made, catalytically active for NOX reduction, thereby reducing the load on the NOX reduction reactor.

The reducing components in spent fuel are primarily CO and $H_2$. A variety of NOX reduction catalysts have been reported which utilize a reagent other than ammonia or other nitrogen based reductant. Their applicability is dictated by the temperature level in the reactor as determined by the reactor's location in the system. The reactor's location in the system is related to the location of the spent fuel oxidation reactor, since the NOX reduction reactor necessarily precedes the spent fuel oxidation reactor, as shown in the attached diagram. If these reactors are located upstream of the cathode 52, temperatures below 500° C. exist, and promoted precious metals (e.g. Rh/ceria or Pd/ceria) similar to a 3-way automotive catalyst are indicated. If these reactors are located downstream of the cathode 52, temperatures well above 700° C. exist, and metal exchanged zeolites (Ag and others) are indicated; combustion catalysts such the hexaluminates, mixed metal oxides, and perovskites are active for NOX reduction and some are stable at temperatures in excess of 1000° C. Base metals like titanium are commercially available for intermediate temperatures between the platinum group and the zeolites.

Oxidation Catalysts
- Noble Metals—Pt group supported on ceramic washcoats and matrices (see automotive catalysts).
- Mixed Metal Oxides/Hexaluminates—Catalytic natural gas combustion at temperatures exceeding 100° C.

The location of the spent fuel oxidation reactor 60 is a complex tradeoff of many factors, including the ability of the preceding NOX reduction reactor to perform in the various locations, the tradeoff between reactor 60 and heat exchanger 40 duties for preheating cathode air, and certain design aspects of the fuel cell 50, including the ability to sustain a pressure differential across the membrane electrolyte assembly and the possibility that separate anode 51 and cathode 52 gas outlets may be merged into an integral spent fuel combustor. The integral spent fuel combustor can be regarded as a subset of the "downstream location" (downstream of the cathode). For a SOFC, the downstream case implies temperatures well above 800° C., and a catalyst for spent fuel oxidation is not necessarily needed. For the "upstream location" (upstream of the cathode) initial temperatures are well below 700° C., and promoted platinum group catalysts are available. An issue with oxidation is that temperatures can increase above the upper limit for catalyst/support stability. Tables 1–5 summarize results for a variety of baseload and/or peaking scenarios with a variety of fuels and should be considered in conjunction with the Figures previously explained.

Feasibility evaluations were conducted for idealized base load and peaking scenarios based upon a "clean and lean" natural gas fuel (without sulfur or higher hydrocarbons). For the base load scenario, an upper limit to NOX emissions is given by engine emissions while operating under rich conditions. For the peaking scenario, a lower limit is given by the equilibrium value at the nominal temperature of the NOX reduction reactor, unless the spent fuel reductant is in limited supply. Depending upon the reactor's location, its temperature will correspond to the inlet or exit temperature of the fuel cell 50. A summary of results is given in Table 1.

TABLE 1

Summary of Scenarios

| | Scenario | | | | |
|---|---|---|---|---|---|
| | 1a | 1b | 2a | 2b | |
| DUTY | 625 | 625 | 1102 | 1098 | net power output (hp) |
| NOX | 0.08 | 0.08 | 0.58 | 1.06 | emissions as NO2 (gram/hp-hr) |
| YIELD | 0.46 | 0.46 | 0.41 | 0.41 | system net power efficiency |
| FCFRAC | 0.62 | 0.62 | 0.35 | 0.35 | fuel cell net power fraction |
| ICEFF | 0.35 | 0.35 | 0.35 | 0.35 | engine efficiency (relative to fuel consumed) |
| ICERAT | 0.75 | 0.75 | 1 | 0.75 | engine air:fuel equivalence ratio |
| TICE | 1400 | 1400 | 1400 | 1400 | engine exhaust temp (F) |
| QDUTY | 0.10 | 0.10 | 0.23 | 0.18 | engine heat loss fraction |
| TPOX | 1303 | 1303 | 1241 | 1303 | reformer temp (F) |
| POXUSE | 0.00 | 0.00 | 0.00 | 0.00 | reformer fuel utilization |
| FCUSE | 0.85 | 0.85 | 0.85 | 0.85 | fuel cell fuel utilization |
| FCERAT | 1.59 | 3.03 | 1.75 | 3.01 | fuel cell air:fuel equivalence ratio |
| ECELL | 0.70 | 0.70 | 0.70 | 0.70 | cell voltage (v) |
| CDENS | 87 | 150 | 186 | 195 | current density (mamp/cm$^2$) |
| FCTL | 1500 | 1500 | 1500 | 1500 | fuel cell min temp (F) |
| FCTH | 1805 | 1849 | 1687 | 1718 | fuel cell max temp (F) |
| FSPLIT | 0.67 | 0.67 | 0.50 | 0.67 | fuel split fraction to engine |
| ASPLIT | 0.00 | 0.00 | 0.00 | 0.00 | air split fraction to anode fuel |
| ESPLIT | 0.00 | 0.00 | 0.67 | 0.00 | exhaust split to cathode air |
| RECYCL | 0.01 | 0.01 | 0.01 | 0.01 | spent fuel recycle ratio |
| F-INDEX | 0.46 | 0.46 | 0.41 | 0.41 | system efficiency index |
| P-INDEX | 1.69 | 1.68 | 1.06 | 0.80 | system power density index |

TABLE 2

Scenario 1a - Base Load with "Upstream" Spent Fuel Combustor Sensitivity Cases

| DUTY | 625.00 | 625.00 | net power output (hp) |
|---|---|---|---|
| NOX | 0.08 | 0.08 | emissions as NO2 (gram/hp-hr) |
| YIELD | 0.46 | 0.46 | system net power efficiency |
| FCFRAC | 0.62 | 0.62 | fuel cell net power fraction |
| ICEFF | 0.35 | 0.35 | engine efficiency (relative to fuel consumed) |
| ICERAT | 0.75 | 0.75 | engine air:fuel equivalence ratio |
| TICE | 1000 | 1400 | engine exhaust temp (F) |
| QDUTY | 0.17 | 0.10 | engine heat loss fraction |
| TPOX | 937 | 1303 | reformer temp (F) |
| POXUSE | 0.00 | 0.00 | reformer fuel utilization |
| FCUSE | 0.85 | 0.85 | fuel cell fuel utilization |
| FCERAT | 1.59 | 1.59 | fuel cell air:fuel equivalence ratio |
| ECELL | 0.70 | 0.70 | cell voltage (v) |
| CDENS | 96 | 87 | current density (mamp/cm$^2$) |
| FCTL | 1500 | 1500 | fuel cell min temp (F) |

TABLE 2-continued

Scenario 1a - Base Load with "Upstream" Spent Fuel Combustor Sensitivity Cases

| FCTH | 1794 | 1805 | fuel cell max temp (F) |
|---|---|---|---|
| FSPLIT | 0.67 | 0.67 | fuel split fraction to engine |
| ASPLIT | 0.00 | 0.00 | air split fraction to anode fuel |
| ESPLIT | 0.00 | 0.00 | exhaust spilt to cathode air |
| RECYCL | 0.01 | 0.01 | spent fuel recycle ratio |
| F-INDEX | 0.46 | 0.46 | system efficiency index |
| P-INDEX | 1.69 | 1.69 | system power density index |

TABLE 3

Scenario 1b - Base Load with "Downstream" Spent Fuel Combustor Sensitivity Cases

| DUTY | 625.00 | 625.00 | net power output (hp) |
|---|---|---|---|
| NOX | 0.08 | 0.08 | emissions as NO2 (gram/hp-hr) |
| YIELD | 0.46 | 0.46 | system net power efficiency |
| FCFRAC | 0.62 | 0.62 | fuel cell net power fraction |
| ICEFF | 0.35 | 0.35 | engine efficiency (relative to fuel consumed) |
| ICERAT | 0.75 | 0.75 | engine air:fuel equivalence ratio |
| TICE | 1000 | 1400 | engine exhaust temp (F) |
| QDUTY | 0.17 | 0.10 | engine heat loss fraction |
| TPOX | 937 | 1303 | reformer temp (F) |
| POXUSE | 0.00 | 0.00 | reformer fuel utilization |
| FCUSE | 0.85 | 0.85 | fuel cell fuel utilization |
| FCERAT | 3.03 | 3.03 | fuel cell air:fuel equivalence ratio |
| ECELL | 0.70 | 0.70 | cell voltage (v) |
| CDENS | 170 | 150 | current density (mamp/cm$^2$) |
| FCTL | 1500 | 1500 | fuel cell min temp (F) |
| FCTH | 1830 | 1849 | fuel cell max temp (F) |
| FSPLIT | 0.67 | 0.67 | fuel split fraction to engine |
| ASPLIT | 0.00 | 0.00 | air split fraction to anode fuel |
| ESPLIT | 0.00 | 0.00 | exhaust spilt to cathode air |
| RECYCL | 0.01 | 0.01 | spent fuel recycle ratio |
| F-INDEX | 0.46 | 0.46 | system efficiency index |
| P-INDEX | 1.68 | 1.68 | system power density index |

Scenario 1—Base Load with Clean and Lean Natural Gas

For a base load application with a clean and lean natural gas, catalytic reactors are not required with the possible exception of one for the spent fuel oxidation reactor, depending upon its location upstream or downstream of the cathode 52. Both locations are considered in this scenario to get some insight into the tradeoffs. Tables 2–3 summarize ASPEN simulation results for unoptimized flowsheets (e.g. cathode air rates are too low for the upstream case). NOX emissions below 0.1 gram per horsepower-hr are indicated along with a power conversion efficiency approaching 50 percent. Low NOX emissions are directly a result of low engine emissions, on the order of 50 ppm, in consequence of rich operating conditions in the engine, as indicated by independent simulations using a commercial engine simulator (Ricardo's WAVE). To accommodate greater emissions from the base load engine (see load following with the base load engine), there is the possibility of rendering Ni-based reformer and/or anode chambers catalytically active for NOX reduction. Space velocities for catalytic NOX reduction are comparable to those available in fuel cells at the typical current densities, as shown in Table 6.

TABLE 6

Space Velocity Requirements for Common Catalytic Systems (vol/hr)/vol

| Calculated estimate for in-stack reaction at 250 mAmp/cm^2 | SCR (NOX Reduction) ref: KOCAT, Inc. 2001 | LTS and SMR ref: SRI, H2 Report 1973 | Calculated estimate for automotive cat. converter |
|---|---|---|---|
| 994 | 3,000–20,000 | 1,000–3,600 | 27,936 |

Scenario 2—Peaking with Clean and Lean Natural Gas

NOX reduction and fuel reforming reactors will be needed depending whether load following is done with standby engines or with the base load engine. Both approaches to load following are considered in this scenario. NOX reduction and spent fuel oxidation reactors are located downstream of the cathode in both cases. Fuel cell power is held near the level used in the base load scenario and engine power output is increased by a factor of about three to respond to a hypothetical surge in power demand. Air and fuel to the engine(s) are increased in such proportions that in the aggregate the engine transitions from rich to lean conditions. Peaking ratio (peaking-load to base-load power ratio) will determine the amount of reductant in spent fuel relative to the stoichiometric equivalent needed for NOX reduction, with implications on how selective the catalyst needs to be.

TABLE 4

Scenario 2a - Peaking with Base Load Engine Sensitivity Cases

| DUTY | 1102 | 1102 | net power output (hp) |
|---|---|---|---|
| NOX | 0.58 | 0.58 | emissions as NO2 (gram/hp-hr) |
| YIELD | 0.41 | 0.41 | system net power efficiency |
| FCFRAC | 0.35 | 0.35 | fuel cell net power fraction |
| ICEFF | 0.35 | 0.35 | engine efficiency (relative to fuel consumed) |
| ICERAT | 1 | 1 | engine air:fuel equivalence ratio |
| TICE | 1000 | 1400 | engine exhaust temp (F) |
| QDUTY | 0.31 | 0.23 | engine heat loss fraction |
| TPOX | 894 | 1241 | reformer temp (F) |
| POXUSE | 0.00 | 0.00 | reformer fuel utilization |
| FCUSE | 0.85 | 0.85 | fuel cell fuel utilization |
| FCERAT | 1.75 | 1.75 | fuel cell air:fuel equivalence ratio |
| ECELL | 0.70 | 0.70 | cell voltage (v) |
| CDENS | 184 | 186 | current density (mamp/cm^2) |
| FCTL | 1500 | 1500 | fuel cell min temp (F) |
| FCTH | 1687 | 1687 | fuel cell max temp (F) |
| FSPLIT | 0.5 | 0.5 | fuel split fraction to engine |
| ASPLIT | 0 | 0 | air split fraction to anode fuel |
| ESPLIT | 0.67 | 0.67 | exhaust spilt to cathode air |
| RECYCL | 0.01 | 0.01 | spent fuel recycle ratio |
| F-INDEX | 0.41 | 0.41 | system efficiency index |
| P-INDEX | 1.06 | 1.06 | system power density index |

TABLE 5

Scenario 2b - Peaking with Standby Engine Sensitivity Cases

| DUTY | 1098 | 1098 | net power output (hp) |
|---|---|---|---|
| NOX | 1.03 | 1.06 | emissions as NO2 (gram/hp-hr) |
| YIELD | 0.41 | 0.41 | system net power efficiency |
| FCFRAC | 0.35 | 0.35 | fuel cell net power fraction |
| ICEFF | 0.35 | 0.35 | engine efficiency (relative to fuel consumed) |
| ICERAT | 0.75 | 0.75 | engine air:fuel equivalence ratio |
| TICE | 1000 | 1400 | engine exhaust temp (F) |
| QDUTY | 0.21 | 0.18 | engine heat loss fraction |
| TPOX | 937 | 1303 | reformer temp (F) |
| POXUSE | 0.00 | 0.00 | reformer fuel utilization |
| FCUSE | 0.85 | 0.85 | fuel cell fuel utilization |
| FCERAT | 3.01 | 3.01 | fuel cell air:fuel equivalence ratio |
| ECELL | 0.70 | 0.70 | cell voltage (v) |
| CDENS | 196 | 195 | current density (mamp/cm^2) |
| FCTL | 1500 | 1500 | fuel cell min temp (F) |
| FCTH | 1709 | 1718 | fuel cell max temp (F) |
| FSPLIT | 0.67 | 0.67 | fuel split fraction to engine |
| ASPLIT | 0.00 | 0.00 | air split fraction to anode fuel |
| ESPLIT | 0.00 | 0.00 | exhaust spilt to cathode air |
| RECYCL | 0.01 | 0.01 | spent fuel recycle ratio |
| F-INDEX | 0.41 | 0.41 | system efficiency index |
| P-INDEX | 0.80 | 0.80 | system power density index |

Tables 4–5 summarize simulation results, again for unoptimized flowsheets (e.g. cathode air rates are too high in both cases). A greater fraction of net power is necessarily derived from the engine(s) in peaking, with lower power conversion efficiency and higher NOX emissions, on the order of 1 gram per horsepower-hr.

Standby engines are assumed to operate at 35 percent efficiency and 2,000 ppm NOX at 1.5 air fuel equivalence ratio and exhaust temperature equivalent to the base load engine. For a peaking ratio of about 2, reductant in spent fuel is about 10 times the stoichiometric NOX equivalent when using standby engines for peaking. Aggregate engine emissions requiring reduction are likely to be smaller when standby engines are used for peaking since the base load engine continues in rich mode while standby engines independently operate well lean of stoichiometric.

Peaking with the base load engine will require a near stoichiometric operating mode with a high level of NOX emissions. At 5,000 ppm NOX emission from the engine, spent fuel reductant will still exceed the stoichiometric equivalent by a factor of about 4. It may be possible to offset the higher NOX load of the single engine concept by operating slightly rich (akin to 3-way catalyst schemes) or by integrating internal NOX reduction into the fuel reformer and/or anode by suitable modification of the typical Ni-based catalysts.

While there has been disclosed what is considered to be the preferred embodiment of the present intention, it is understood that various changes in the details may be made without departing from the spirit, or sacrificing any of the advantages of the present invention.

The embodiments of the invention in which an exclusive property or privileges is claimed are defined as follows:

1. A high efficiency system for producing energy from a hydrocarbon fuel while maintaining low polluting emissions, comprising an internal combustion engine in communication with a source of oxidizing fluid and a source of hydrocarbon fuel producing power and an exhaust gas from the combustion of the hydrocarbon fuel and at least some of the oxidizing fluid, a fuel cell producing power, said fuel cell and having an anode in communication with a source of synthesis gas including hydrogen gas and a cathode in communication with at least some of the oxidizing fluid and having an anode output and a cathode output; an optional reformer which if present is in selective communication with a portion of the exhaust gas from the internal combustion engine and in selective communication with a portion of the oxidizing fluid from the source thereof and in communication with at least some of the hydrocarbon fuel for producing a synthesis gas including hydrogen as an input to the fuel cell anode; an oxidizer in communication with exhaust gas from the fuel cell anode and in selective communication with the exhaust gas from the internal combustion engine and in selective communication with at least some of the oxidizing fluid before or after it passes through the cathode and having an output gas either as an input to the cathode or vented to the atmosphere after passing in heat exchange relationship with oxidizing fluid to preheat oxidizing fluid before the oxidizing fluid is introduced to the cathode, a heat exchanger providing heat exchange relationship between the output of the fuel cell cathode before or after the cathode output passes through the oxidizer and at least a portion of the oxidizing fluid for preheating oxidizing fluid before the oxidizing fluid enters the cathode, a proportioning mechanism connected to the output gases from the internal combustion engine and the source of oxidizing fluid to adjust the composition of gases entering the fuel cell anode and cathode to accommodate both lean burn conditions in which the air to fuel equivalence is greater than 1 and rich burn conditions in which the fuel to air equivalence ratio is greater than 1 in the internal combustion engine while providing a reducing atmosphere in the reformer if present and the anode and an oxidizing atmosphere in the oxidizer and the cathode to reduce internal combustion engine pollutants including emissions of $NO_x$, CO, and unburned hydrocarbons while achieving high overall system efficiency.

2. The high efficiency system of claim 1, wherein the overall system efficiency is in the range of from about 35% to about 50%.

3. The high efficiency system of claim 1, wherein the internal combustion engine is one or more of a diesel or a spark ignited 2-cycle or 4-cycle engine.

4. The high efficiency system of claim 1, wherein the fuel cell is one or more of a high temperature solid oxide or a molten carbonate fuel cell.

5. The high efficiency system of claim 1, wherein the reformer partially oxidizes and reforms hydrocarbon fuel from the source thereof at a temperature in the range of from about 1200° F. to about 1800° F. in the presence of gases from the internal combustion engine having an atomic oxygen to carbon ratio greater than 1.

6. The high efficiency system of claim 1, wherein synthesis gas from the reformer includes hydrogen present in the range of from about 1% by volume to about 20% by volume and carbon monoxide present in the range of from about 1% by volume to about 20% by volume and hydrocarbons 90% of which have up to three carbon atoms present in the range of from about 1% by volume to about 20% by volume.

7. The high efficiency system of claim 1, wherein the oxidizer contains a catalyst of one or more of a noble metal supported on a ceramic washcoat and matrix or a mixed metal oxide/hexaluminate or a nickel group and an alkali promoter, or a metal exchange zeolite.

8. The high efficiency system of claim 1, wherein the oxidizer is a thermal oxidizer operating at a temperature not less than about 1800° F.

9. The high efficiency system of claim 1, wherein gas exiting the system to the atmosphere is at a temperature of less than about 1000° F.

10. The high efficiency system of claim 1, wherein gas exiting the system has a nitrogen oxide emission of less than 1 g/horsepower-hour.

11. The high efficiency system of claim 1, wherein gas exiting the system has a nitrogen oxide emission in the range of from about 0.1 g/horsepower-hour and about 1 g/horsepower-hour.

12. The high efficiency system of claim 1, wherein the fuel cell anode output in the oxidizer is in the range of from about 10% by volume to about 50% by volume.

13. The high efficiency system of claim 1, wherein the reformer contains a catalyst of one or more of a nickel oxide pre-reforming catalyst or a nickel oxide autothermal catalyst or a promoted platinum based catalyst.

14. The high efficiency system of claim 1, wherein the internal combustion engine is a stationary power generator.

15. The high efficiency system of claim 1, wherein the cathode output has a temperature in the range of from about 1400° F. to about 1800° F.

16. The high efficiency system of claim 1, wherein the oxidizing gas entering the cathode is preheated by heat exchange contact with the cathode output to a temperature of not less than about 450° F.

17. A high efficiency system for producing energy from a hydrocarbon fuel while maintaining low polluting emissions, comprising an internal combustion engine in communication with a source of oxidizing fluid and a source of hydrocarbon fuel producing power and an exhaust gas from the combustion of the hydrocarbon fuel and at least some of the oxidizing fluid, a fuel cell producing power, said fuel cell having an anode in communication with a source of synthesis gas including hydrogen gas and a cathode in communication with at least some of the oxidizing fluid and having an anode output and a cathode output, an optional reformer which if present is in selective communication with a portion of the exhaust gas from the internal combustion engine and in selective communication with a portion of the oxidizing fluid from the source thereof and in communication with at least some of the hydrocarbon fuel for producing a synthesis gas including hydrogen as an input to the fuel cell anode, an oxidizer in communication with the exhaust gas from the fuel cell anode and in selective communication with the exhaust gas from the internal combustion engine and in selective communication with at least some of the oxidizing fluid and having an output gas as an input to the fuel cell cathode, a heat exchanger providing heat exchange relationship between the output of the fuel cell cathode and at least a portion of the oxidizing fluid for preheating oxidizing fluid to the oxidizer, a proportioning mechanism connected to the output gases from the internal combustion engine and the source of oxidizing fluid to adjust the composition of gases entering the fuel cell anode and cathode to accommodate both lean burn conditions in which the air to fuel equivalence ratio is greater than 1 and rich burn conditions in which the fuel to air equivalence ratio is greater than 1 in the internal combustion engine while providing a reducing atmosphere in the reformer if present and the anode and an oxidizing atmosphere in the oxidizer and the cathode to reduce internal combustion engine pollutants including emissions of $NO_x$, CO, and unburned hydrocarbons while achieving high overall system efficiency.

18. The high efficiency system of claim 17, wherein the oxidizer uses air and a portion of the exhaust gas from the internal combustion engine as the oxidizing fluid.

19. A high efficiency system for producing energy from a hydrocarbon fuel while maintaining low polluting emissions, comprising an internal combustion engine in communication with a source of oxidizing fluid and a source of hydrocarbon fuel producing power and an exhaust gas from the combustion of the hydrocarbon fuel and at least some of the oxidizing fluid, a fuel cell producing power, said fuel cell having an anode in communication with a source of synthesis gas including hydrogen gas and a cathode in communication with at least some of the oxidizing fluid and having an anode output and a cathode output; an optional reformer if present is in selective communication with a portion of the exhaust gas from the internal combustion engine and in selective communication with a portion of the oxidizing fluid from the source thereof and in communication with at least some of the hydrocarbon fuel for producing a synthesis gas including hydrogen as an input to the fuel cell anode; an oxidizer in communication with the exhaust gas from the fuel cell anode and in selective communication with the exhaust gas from the internal combustion engine and in selective communication with at least some of the oxidizing fluid in the cathode output and having an output gas as vented to the atmosphere after passing in heat exchange relationship with oxidizing fluid to preheat oxidizing fluid before it is introduced to the cathode, a heat exchanger providing heat exchange relationship between the output of the fuel cell cathode and at least a portion of the oxidizing fluid for preheating oxidizing fluid to the oxidizer, a proportioning mechanism connected to the output gases from the internal combustion engine and the source of oxidizing fluid to adjust the composition of gases entering the fuel cell anode and cathode to accommodate both lean burn conditions in which the fuel to air equivalence ratio is greater than 1 and rich burn conditions in which the air to fuel equivalence ratio is greater than 1 in the internal combustion engine while providing a reducing atmosphere in the reformer if present and the anode and an oxidizing atmosphere in the oxidizer and the cathode to reduce internal combustion engine pollutants including emissions of $NO_x$, CO, and unburned hydrocarbons while achieving high overall system efficiency.

20. A high efficiency system for producing energy from a hydrocarbon fuel while maintaining low polluting emissions, comprising an internal combustion engine in communication with a source of oxidizing fluid and a source of hydrocarbon fuel producing power and an exhaust gas from the combustion of the hydrocarbon fuel and at least some of the oxidizing fluid, a fuel cell producing power, said fuel cell having an anode in communication with a source of synthesis gas including hydrogen gas and a cathode in communication with at least some of the oxidizing fluid and having an anode output and a cathode output, an optional catalytic reformer which if present contains a catalyst of one or more of a nickel oxide pre-reforming catalyst or a nickel oxide autothermal catalyst or a promoted platinum based catalyst in selective communication with a portion of the exhaust gas from the internal combustion engine and in selective communication with a portion of the oxidizing fluid from the source thereof and in communication with at least some of the hydrocarbon fuel for producing a synthesis gas including hydrogen as an input to the fuel cell anode, a catalytic oxidizer containing one or more of a noble metal supported on a ceramic washcoat and matrix or a mixed metal oxide/hexaluminate or a nickel group and an alkali promoter, or a metal exchange zeolite in communication with the exhaust gas from the fuel cell anode and in selective communication with the exhaust gas from the internal combustion engine and in selective communication with at least some of the oxidizing fluid before or after it passes through the cathode and having an output gas either as an input to the fuel cell cathode or vented to the atmosphere after passing in heat exchange relationship with oxidizing fluid to preheat oxidizing fluid before the oxidizing fluid is introduced to the cathode, a heat exchanger providing heat exchange relationship between the output of the fuel cell cathode before or after the cathode output passes through the oxidizer and at least a portion of the oxidizing fluid for preheating oxidizing fluid before the oxidizing fluid enters the cathode, a proportioning mechanism connected to the output gases from the internal combustion engine and the source of oxidizing fluid to adjust the composition of gases entering the fuel cell anode and cathode to accommodate both lean burn conditions in which the air to fuel equivalence ratio is greater than 1 and rich burn conditions in which the fuel to air equivalence ratio is greater than 1 in the internal combustion engine while providing a reducing atmosphere in the reformer if present and the anode and an oxidizing atmosphere in the oxidizer and the cathode to reduce internal combustion engine pollutants including emissions of $NO_x$, CO, and unburned hydrocarbons while achieving high overall system efficiency.

\* \* \* \* \*